(12) United States Patent
Elend

(10) Patent No.: US 7,515,014 B2
(45) Date of Patent: Apr. 7, 2009

(54) METHOD FOR DETERMINING CABLE TERMINATION RESISTANCES IN COMMUNICATION NETWORKS AND A CORRESPONDING COMMUNICATION NETWORK

(75) Inventor: Bernd Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 11/997,218

(22) PCT Filed: Jul. 31, 2006

(86) PCT No.: PCT/IB2006/052610

§ 371 (c)(1),
(2), (4) Date: Jan. 29, 2008

(87) PCT Pub. No.: WO2007/017789

PCT Pub. Date: Feb. 15, 2007

(65) Prior Publication Data

US 2008/0211599 A1    Sep. 4, 2008

(30) Foreign Application Priority Data

Aug. 10, 2005  (EP) .................................. 05107334

(51) Int. Cl.
*H03H 7/38* (2006.01)

(52) U.S. Cl. ...................................... 333/22 R; 333/32

(58) Field of Classification Search ............... 333/22 R, 333/32
See application file for complete search history.

(56) References Cited

FOREIGN PATENT DOCUMENTS

| EP | 1288078 A2 | 3/2003 |
|----|-----------|--------|
| WO | 199308659 A1 | 4/1993 |
| WO | 200070474 A1 | 11/2000 |

*Primary Examiner*—Stephen E Jones
(74) *Attorney, Agent, or Firm*—Aaron Waxler

(57) ABSTRACT

The invention relates in general to a method for determining cable termination resistances in communication networks and a corresponding communication network, and is applicable especially to high-speed communication networks in automobiles, which uses dual-wire harnesses like FlexRay e.g. For this purpose a method for determining cable termination resistances in communication networks is proposed, where a termination resistance is assigned to at least a part of the cable ends of the network in accordance with the following steps determining for each cable end the cable length to any other cable end, assigning a weight value to each length where lengths with greater values are combined with higher weights than lengths with smaller values, for all cable ends: summing up the weights assigned to all lengths starting from a specific cable end and assigning this sum to the respective cable end as the weight of this cable end, determining the termination resistance of a specific cable end by multiplying the cable impedance Z with a constant of proportionality and the sum of the weights of all cable ends divided by the weight of the specific cable end.

10 Claims, 1 Drawing Sheet

Figure 1:
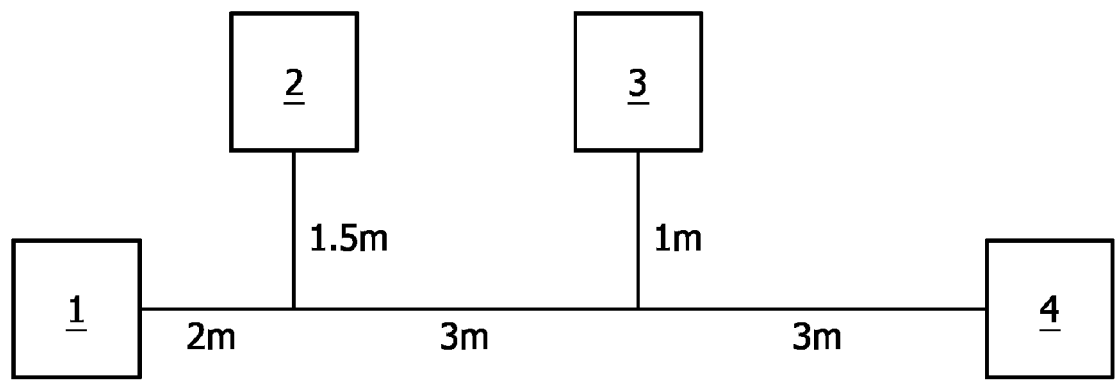

METHOD FOR DETERMINING CABLE TERMINATION RESISTANCES IN COMMUNICATION NETWORKS AND A CORRESPONDING COMMUNICATION NETWORK

The invention relates in general to a method for determining cable termination resistances in communication networks and a corresponding communication network, and is applicable especially to high-speed communication networks in automobiles, which uses dual-wire harnesses like FlexRay e.g.

The dual-wire cable in those harnesses needs to be terminated because of reflections otherwise. A reflection in a cable is the result of an impedance discontinuity that a travelling wave sees as it propagates down the line. To eliminate the presence of reflections from the end of the cable, the line has to be terminated at its characteristic impedance by placing a resistor across the line. In low-speed applications (e.g. CAN [Controller Area Network], 125 kBit/s) often only two cable ends of the harness are terminated with a resistance that equals the characteristic cable impedance and all other cable ends with an infinite resistance. This concept, however, leads to multiple reflections of the data signal at those cable ends. In high-speed applications (e.g. FlexRay, 10 MBit/s) these reflections make communication impossible in many network topologies.

Until now several concepts for terminating the both ends of the main cable of a communication network are used. An often used termination option for RS-485 busses is to connect a single resistor across the conductor pair at each end, where the resistor value matches the cable's differential-mode characteristic impedance. Terminating the bus in this way, no reflections occur at this two main cable ends, and the signal fidelity is excellent. However, beside the improper terminated other cable ends, a second disadvantage of such a termination is the power dissipated in the termination resistors. Another option is a modification of this parallel termination, for example to provide a fail-save bias.

To minimize power dissipation, an RC termination can be used. The single resistor in the solution described above, is than replaced by a resistor in series with a capacitor. The capacitor appears as a short circuit during transition, and the resistor terminates the line. Once the capacitor charges, it blocks the DC loop current and presents a light load to the driver. Lowpass effects limit the use of the RC termination to lower data-rate applications, however.

In DSL systems, especially VDSL systems, for terminating often a impedance matching approach is used, where a resistor is used equal to the average input impedance magnitude over the VDSL frequency band of a very long 26 gauge twisted-pair cable as an a priori best guess.

To obtain an improved impedance matching one uses an adaptive hybrid terminating impedance. The simplest adaptive termination impedance matching technique is to adjust a variable resistance device, such that its resistance is equal to the magnitude of the line input impedance at one frequency. Alternately, the average of line input impedance across a particular frequency band can be used. Another approach to match the terminating impedance is to minimize the near-end echo.

The termination techniques described above in brief are conventionally applied to only the two main cable end of a harness, while the other cable ends are terminated with an infinite resistance causing harmful effects of reflection at this ends.

It is therefore an object of the present invention to provide a method for determining cable termination resistances in communication networks and a corresponding communication network which overcome the disadvantages described above and improve the high-speed communication in network topologies.

This object is solved according to the invention by the characterizing features of claims 1 and 8 in conjunction with the features recited in the preamble. Advantageous embodiment of the invention are recited in the dependent claims.

According to an aspect of the present invention a method for determining cable termination resistances in communication networks is used, where a termination resistance is assigned to at least a part of the cable ends of the network in accordance with the following steps determining for each cable end the cable length to any other cable end, assigning a weight value to each length where lengths with greater values are combined with higher weights than lengths with smaller values, for all cable ends: summing up the weights assigned to all lengths starting from a specific cable end and assigning this sum to the respective cable end as the weight of this cable end, determining the termination resistance of a specific cable end by multiplying the cable impedance Z with a constant of proportionality and the sum of the weights of all cable ends divided by the weight of the specific cable end. Preferably a common constant of proportionality is used for all cable ends. Advantageously the common constant of proportionality is equal 0.5.

In a preferred embodiment of the method the equivalent resistance resulting from a parallel connection of all termination resistances is equal to half of the cable impedance Z in any case.

Furthermore preferably a common constant of proportionality is used for all cable ends. Advantageously the common constant of proportionality is equal 0.5.

In another preferred embodiment of the method the weights are successive natural numbers.

In yet another preferred embodiment of the method the weights of the cable ends are successive natural numbers raised to the power of a common exponent. Preferably said common exponent lies in the range of (1, 4].

It is aspect of the present invention to provide a method to calculate a termination resistance for each cable end of a wiring harness or of a communication network considering the topology of harness or network so that the harmful effect of reflections is minimized and thus high-speed communication becomes possible on a much wider range of network topologies as it is possible state-of-the-art termination concepts.

According to an another aspect of the present invention all cable ends of the network are terminated by termination resistances having values determined by a method in accordance with one of the claims 1 to 6.

The foregoing and other objects, features, and advantages of the invention will be apparent from the following more particular description of preferred embodiments of the invention, as illustrated in the accompanying drawings.

The present invention will now be described by way of example with reference to the accompanying drawings, in which:

FIG. 1 shows an exemplary wiring harness with four cable ends.

The exemplary network topology according to FIG. 1 is used to describe the calculation method.

First step of the calculation method is to determine the cable length from each cable end to all other cable ends in the network.

| from i | to j | length $l_{ij}$ |
|---|---|---|
| 1 | 2 | 3.5 m |
| 1 | 3 | 6.0 m |
| 1 | 4 | 8.0 m |
| 2 | 3 | 5.5 m |
| 2 | 4 | 7.5 m |
| 3 | 4 | 4.0 m |

Second step of the calculation method is to sort the lengths $l_{ij}$ in ascending order and assign a 'weight' of 1 to the shortest one, a 'weight' of 2 to the next longer one and so on.

| length $l_{ij}$ | weight $w_{ij}$ |
|---|---|
| 3.5 m | 1 |
| 4.0 m | 2 |
| 5.5 m | 3 |
| 6.0 m | 4 |
| 7.5 m | 5 |
| 8.0 m | 6 |

In the third step the weights $w_{ij}$ that belong to all lengths starting at the same cable end i are summed up; the result is the weight $w_i$ of the cable end i.

| cable end i | weight $w_i$ |
|---|---|
| 1 | 11 = 1 + 4 + 6 (3.5 m, 6.0 m, 8.0 m) |
| 2 | 9 = 1 + 3 + 5 (3.5 m, 5.5 m, 7.5 m) |
| 3 | 9 = 4 + 3 + 2 (6.0 m, 5.5 m, 4.0 m) |
| 4 | 13 = 6 + 5 + 2 (8.0 m, 7.5 m, 4.0 m) |

Calculate the termination resistance Ri of each cable end by multiplying half of the cable impedance Z with the sum of the weights of all cable ends divided by the weight $w_i$ of the individual cable end is the fourth and last step.

| node | termination resistance |
|---|---|
| 1 | R1 = (Z/2) × (11 + 9 + 9 + 13)/11 = (Z/2) × 42/11 |
| 2 | R2 = (Z/2) × 42/9 |
| 3 | R3 = (Z/2) × 42/9 |
| 4 | R4 = (Z/2) × 42/13 |

This method can be applied to network topologies with an arbitrary number of cable ends.

The equivalent resistance resulting from a parallel connection of all termination resistances is equal to Z/2 in any case.

Additional Variant:

In order to finetune the result, which might be necessary in some cases, the third step can be modified by applying an exponent to the result $w_i$ of the summation. Here for example:

| cable end | weight $w_i^*$ |
|---|---|
| 1 | $(1 + 4 + 6)^{1.2}$ = 17.8 |
| 2 | $(1 + 3 + 5)^{1.2}$ = 13.9 |
| 3 | $(4 + 3 + 2)^{1.2}$ = 13.9 |
| 4 | $(6 + 5 + 2)^{1.2}$ = 21.7 |

Exponents in the range [1 ... 4] have shown good results in practice.

The method can be applied to communication networks like CAN and FlexRay.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit of the invention as defined in the following claims.

LIST OF REFERNCES 1 cable ends
2 cable ends
3 cable ends
4 cable ends

The invention claimed is:

1. A method for determining cable termination resistances in communication networks, characterized in that a termination resistance is assigned to at least a part of the cable ends of the network comprising:
   determining for each cable end the cable length to any other cable end,
   assigning a weight value to each length where lengths with greater values are combined with higher weights than lengths with smaller values,
   for all cable ends: summing up the weights assigned to all lengths starting from a specific cable end and assigning this sum to the respective cable end as the weight of this cable end,
   determining the termination resistance of a specific cable end by multiplying the cable impedance Z with a constant of proportionality and the sum of the weights of all cable ends divided by the weight of the specific cable end.

2. The method in accordance with claim 1, characterized in that the equivalent resistance resulting from a parallel connection of all termination resistances is equal to half of the cable impedance Z in any case.

3. The method in accordance with claim 1, characterized in that the weights are successive natural numbers.

4. A communication network characterized in that all cable ends of the network are terminated by termination resistances having values determined by a method in accordance with claim 1.

5. The method in accordance with claim 1, characterized in that the weights of the cable ends are successive natural numbers raised to the power of a common exponent.

6. The method in accordance with claim 5, characterized in that the common exponent lies in the range of (1, 4].

7. The method in accordance with claim 1, characterized in that a common constant of proportionality is used for all cable ends.

8. The method in accordance with claim 7, characterized in that the common constant of proportionality is equal to 0.5.

9. A communication network with termination resistances determined by a method in accordance with claim 1.

10. A communication network in accordance with claim 9, characterized in that the network is configured as a Controller Area Network (CAN) or as a FlexRay network.

* * * * *